United States Patent
Egami et al.

(10) Patent No.: US 9,419,491 B2
(45) Date of Patent: Aug. 16, 2016

(54) MOTOR CONNECTING MEMBER AND MOTOR DEVICE

(71) Applicant: Hitachi Metals, Ltd., Tokyo (JP)

(72) Inventors: Kenichi Egami, Kitaibaraki (JP); Kazuhiko Tomita, Mito (JP); Kazuyuki Watanabe, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 76 days.

(21) Appl. No.: 14/250,844

(22) Filed: Apr. 11, 2014

(65) Prior Publication Data

US 2014/0306561 A1   Oct. 16, 2014

(30) Foreign Application Priority Data

Apr. 15, 2013   (JP) .................................. 2013-085287

(51) Int. Cl.
*H02K 5/24* (2006.01)
*H02K 3/50* (2006.01)
*H02K 3/28* (2006.01)
*H02K 3/12* (2006.01)

(52) U.S. Cl.
CPC .. *H02K 3/50* (2013.01); *H02K 3/12* (2013.01); *H02K 3/28* (2013.01); *H02K 2203/06* (2013.01)

(58) Field of Classification Search
CPC ... H02K 3/522; H02K 5/225; H02K 2203/09; H02K 3/50; H02K 2203/06
USPC .......................................................... 310/71
See application file for complete search history.

(56) References Cited

U.S. PATENT DOCUMENTS

| | | | |
|---|---|---|---|
| 4,177,397 A * | 12/1979 | Lill | 310/71 |
| 7,045,920 B2 | 5/2006 | Ohuchi et al. | |
| 7,476,995 B2 * | 1/2009 | Uchiyama et al. | 310/71 |
| 8,106,550 B2 | 1/2012 | Muramoto | |
| 2004/0066103 A1 | 4/2004 | Ohuchi et al. | |
| 2009/0108688 A1 * | 4/2009 | Miura | 310/71 |
| 2010/0133934 A1 | 6/2010 | Muramoto | |
| 2010/0201212 A1 * | 8/2010 | Urano et al. | 310/71 |
| 2011/0175472 A1 * | 7/2011 | Koike et al. | 310/71 |
| 2012/0126646 A1 * | 5/2012 | Nakagawa et al. | 310/71 |
| 2013/0264899 A1 | 10/2013 | Goto et al. | |

FOREIGN PATENT DOCUMENTS

| | | |
|---|---|---|
| JP | 2011259654 A | 12/2011 |
| WO | 2004080962 A | 3/2004 |
| WO | 2010130803 A | 6/2010 |
| WO | 2012090295 A1 | 7/2012 |

OTHER PUBLICATIONS

Japanese Office Action for corresponding application No. 2013-085287 dated May 24, 2016 and English translation.

* cited by examiner

*Primary Examiner* — Dang Le
*Assistant Examiner* — Leda Pham
(74) *Attorney, Agent, or Firm* — Roberts Mlotkowski Safran Cole & Calderon, PC

(57) ABSTRACT

A motor connecting member, which connects a motor winding and a terminal block, includes a terminal to be connected to the terminal block, a winding connecting portion to be connected to the motor winding, and an extended portion extending between the terminal and the winding connecting portion. The extended portion is made by plastically deforming a single wire having a circular cross section, and is bent in a predetermined shape fitted for connection between an end of the motor winding connected with the winding connecting portion and the terminal block.

7 Claims, 10 Drawing Sheets

FIG.6A
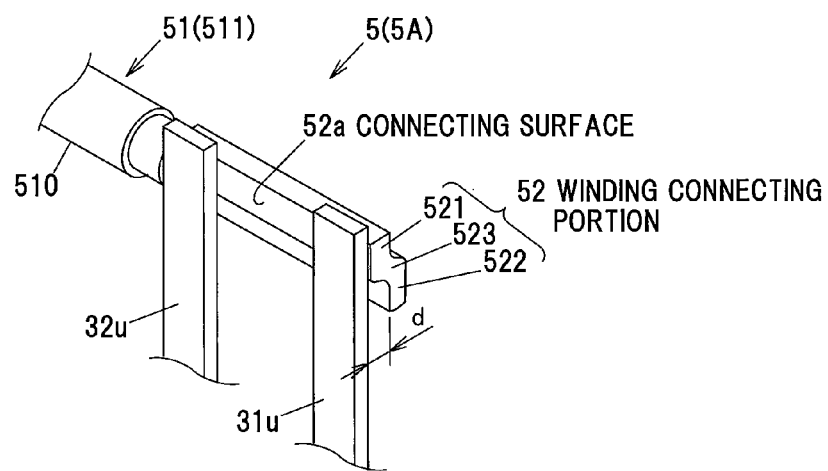
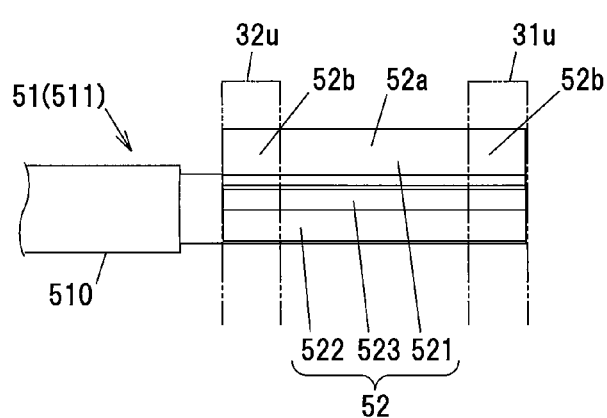
FIG.6B
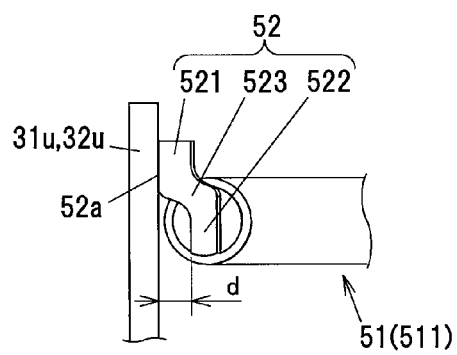
FIG.6C

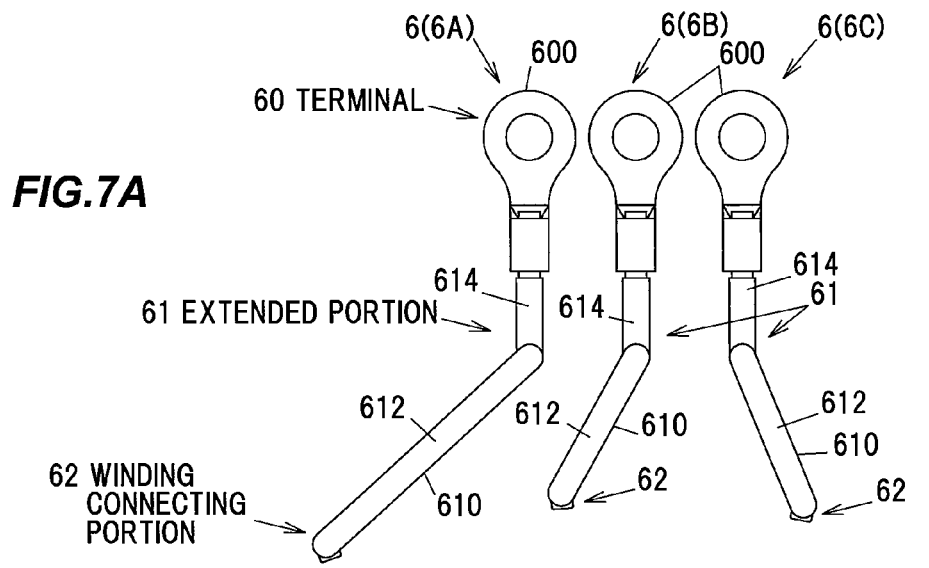
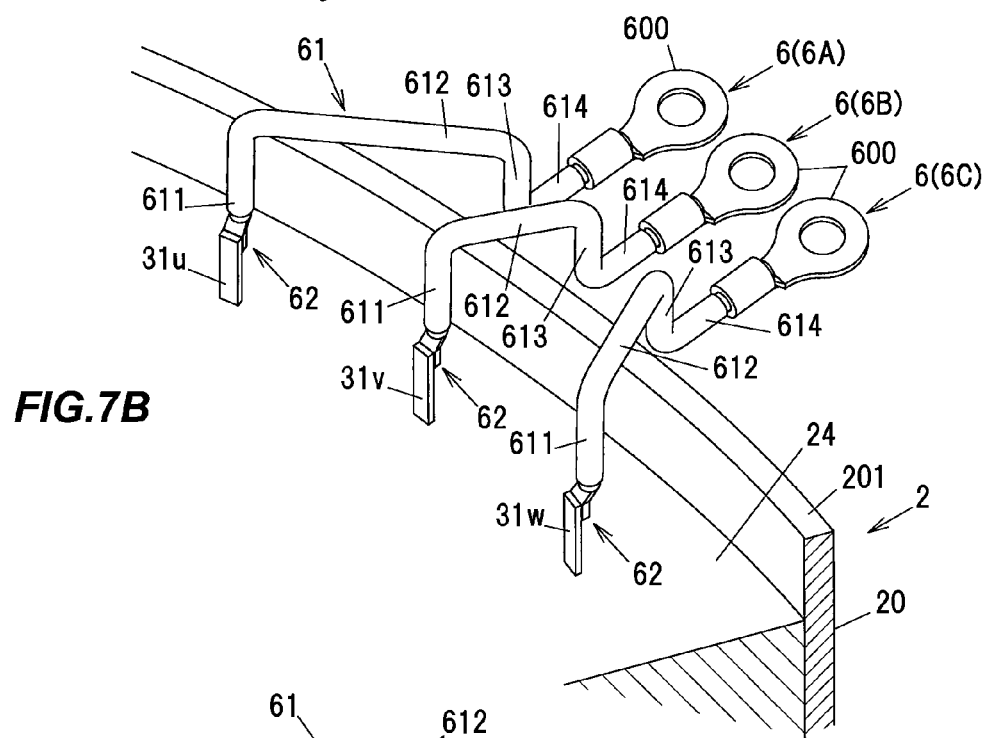
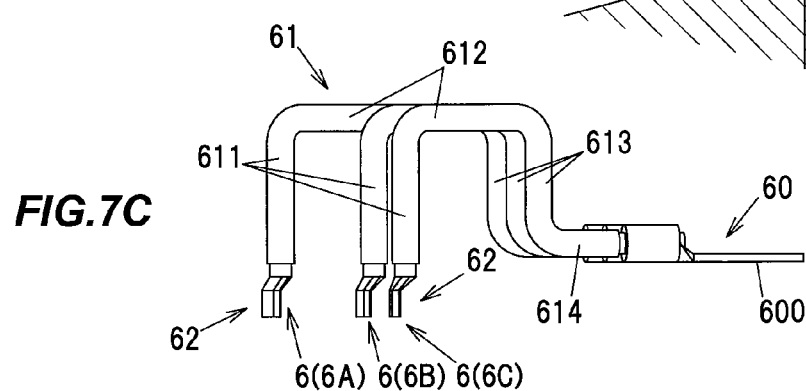

62a CONNECTING SURFACE

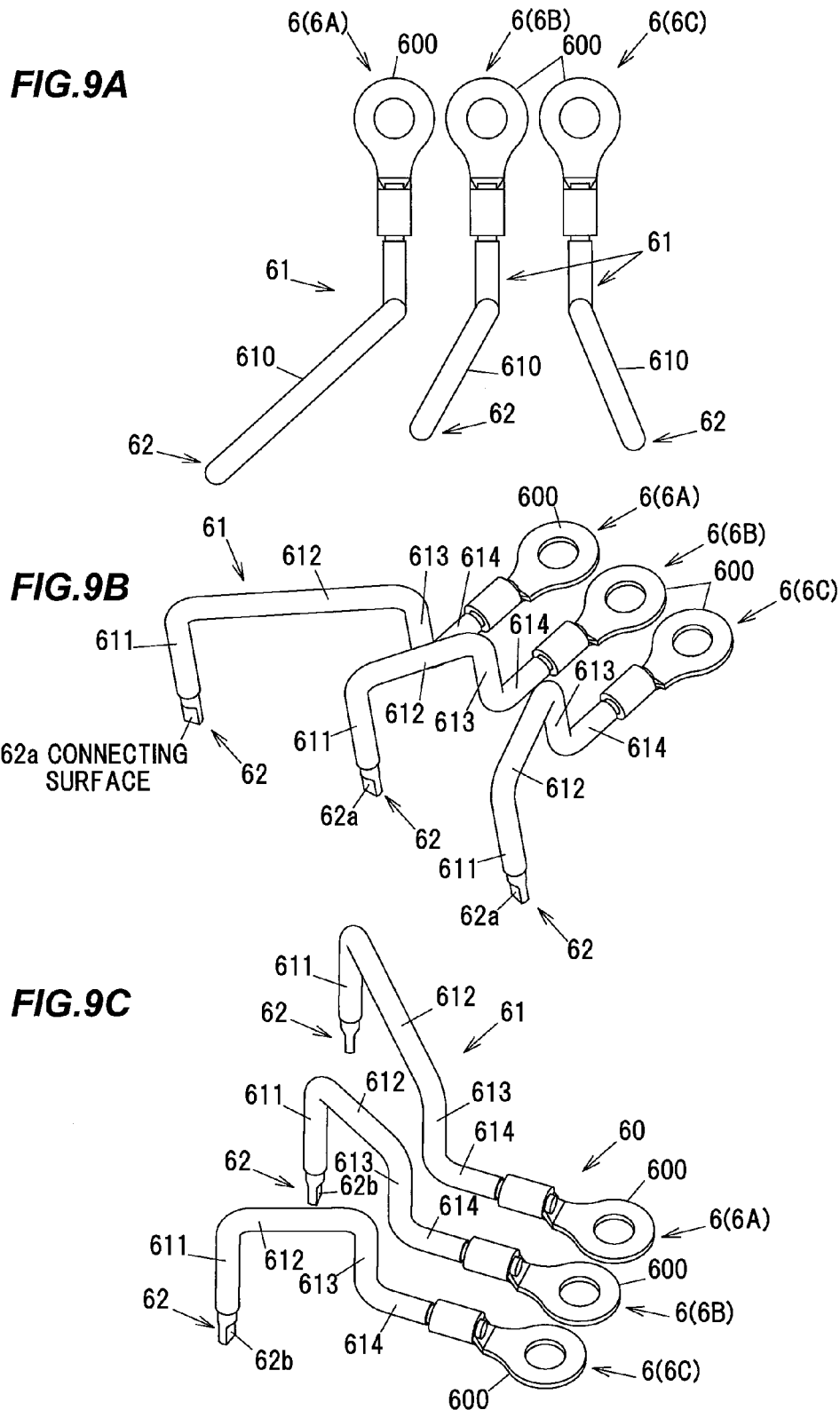

62a CONNECTING SURFACE

MOTOR CONNECTING MEMBER AND MOTOR DEVICE

The present application is based on Japanese patent application No. 2013-085287 filed on Apr. 15, 2013, the entire contents of which are incorporated herein by reference.

BACKGROUND OF THE INVENTION

1. Field of the Invention

This invention relates to a motor connecting member which connects a winding of a motor and a terminal. It also relates to a motor device including that motor connecting member.

2. Description of the Related Art

As a conventional motor connecting member, an interconnecting member as disclosed in JP-A-2012-110188 has been known. This interconnecting member is used to electrically connect together an output terminal of a bus bar, which is connected to a plurality of coils in a motor case for accommodating a rotor and a stator, and an external connection terminal. The external connection terminal is connected to e.g. a terminal block, and is provided with a motor current from an inverter.

The stator comprises a stator core made of a magnetic material, an insulator made of an insulating material, and a coil. The stator core comprises coupled divided cores, which are formed by laminating a plurality of steel plates, and includes a cylindrical core back, and a plurality of teeth, which are radially provided around an inner side of the core back. The teeth of the stator core are mounted with the insulator therearound, and the coil is formed by winding motor windings around the teeth respectively with the insulator therebetween. The motor windings are made of an electrically conductive wire such as an enameled copper wire or the like.

The motor windings wound around the teeth are embedded in a molded resin, excluding respective both ends thereof. The respective both ends of the motor windings are drawn out to an opening side of the motor case, and are connected to the bus bar held by an annular holding member formed of a resin.

The interconnecting member comprises a terminal member, which is connected to the output terminal of the bus bar, and a connecting wire, which is fixed to the terminal member and connected to the external connection terminal. The connecting wire comprises a stranded wire made from a plurality of wire rods bundled together. And, the interconnecting member can flexibly be bent because the connecting wire comprises the stranded wire. Therefore, the interconnecting member allows facilitating the connection of the external connection terminal to a terminal block.

Refer to e.g. JP-A-2012-110188.

SUMMARY OF THE INVENTION

However, when the above described interconnecting member has been applied to e.g. a motor for a vehicle driving source, swinging of the connecting wire has resulted from vibration due to the connecting wire being composed of the stranded wire, and has been likely to cause breaking of some of the wire rods due to long-term use thereof. Further, in view of the swinging of the connecting wire, in order for no contact between the connecting wire and the members therearound to occur, the connecting wire and the members therearound have been likely to be required to be spaced wide apart, leading to an increase in device size.

Accordingly, it is an object of the present invention to provide a motor connecting member, which is easily capable of connection between a motor winding and a terminal block, and suppressing swinging due to vibration. It is another object of the present invention to provide a motor device including that motor connecting member.

(1) According to one embodiment of the invention, a motor connecting member, which connects a motor winding and a terminal block, comprises:
  a terminal to be connected to the terminal block;
  a winding connecting portion to be connected to the motor winding; and
  an extended portion extending between the terminal and the winding connecting portion,
  wherein the extended portion is made by plastically deforming a single wire having a circular cross section, and is bent in a predetermined shape fitted for connection between an end of the motor winding connected with the winding connecting portion and the terminal block.

In the embodiment, the following modifications and changes can be made.
  (i) The winding connecting portion is formed integrally with the extended portion by plastically deforming the single wire, and a connecting surface, which is connected to the motor winding, is formed as a flat surface.
  (ii) The winding connecting portion includes a plurality of contacts spaced apart from each other in a longitudinal direction thereof, to be connected with the motor winding.
  (iii) The winding connecting portion is connected by welding to the motor winding.
  (iv) The extended portion is coated by an insulating member made of a resin.
  (v) The terminal, the winding connecting portion, and the extended portion are not coated by an insulating member.

(2) According to another embodiment of the invention, a motor device comprises:
  the above defined motor connecting member, and
  a motor in which the above motor winding is connected to the above winding connecting portion.

Points of the Invention

The motor connecting member and the motor device according to the present invention can easily connect between a motor winding and a terminal block, and suppress swinging due to vibration.

BRIEF DESCRIPTION OF THE DRAWINGS

The preferred embodiments according to the invention will be explained below referring to the drawings, wherein:

FIGS. 5A and 5B are a perspective view and a plan view respectively showing a state when connecting terminals of three connecting members to the terminal block;

FIG. 5C is a perspective view showing the terminal block;

FIGS. 6A to 6C show an enlarged view of a winding connecting portion to be connected to an end of the motor windings, FIG. 6A is a perspective view showing a state in which the winding connecting portion is in contact with an end of a U phase winding, FIG. 6B is a plan view showing the winding connecting portion when viewed from its connecting surface side, FIG. 6C is a plan view showing a state showing an end of the winding connecting portion and the U phase winding when viewed in a longitudinal direction of the winding connecting portion;

FIGS. 7A, 7B, and 7C are a front view, a perspective view, and a side view respectively showing a plurality of connecting members in a second embodiment;

FIGS. 9A, 9B, and 9C are a front view, a perspective view, and a side view respectively showing a plurality of connecting members in a third embodiment;

DETAILED DESCRIPTION OF THE EMBODIMENTS

The First Embodiment

Figure 1:
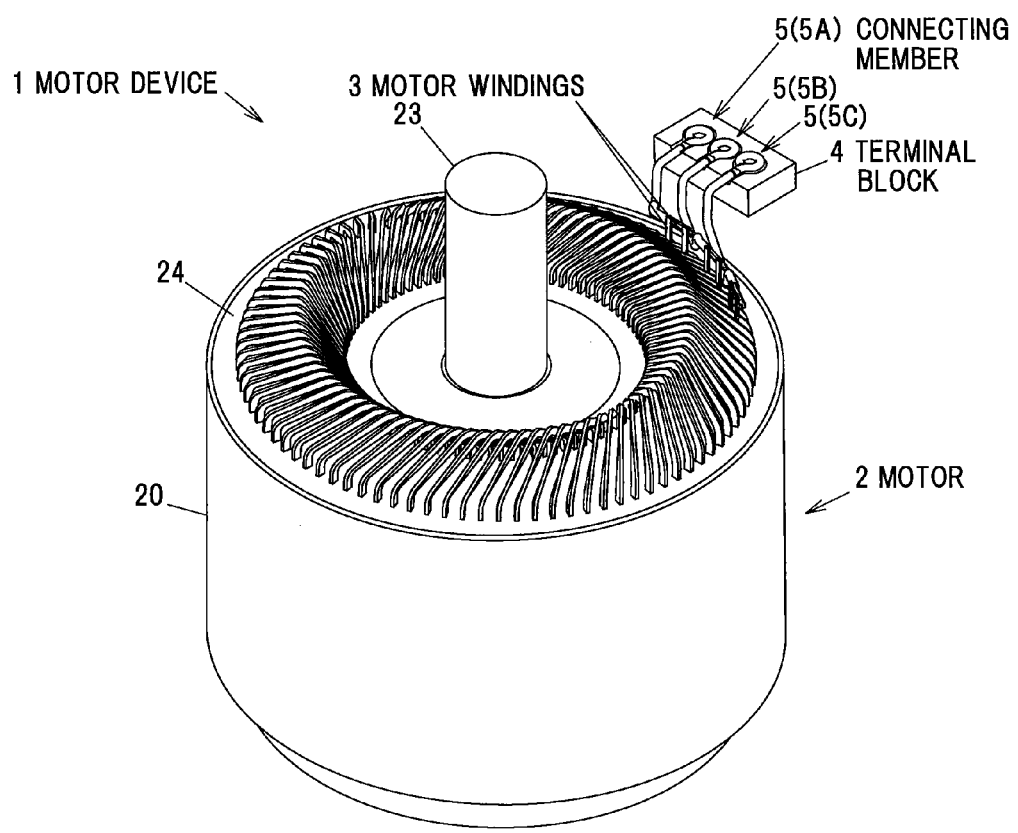
FIG. 1 is a perspective view showing a motor device in a first embodiment according to the present embodiment.

FIG. 1 is a perspective view showing a motor device in the present embodiment. FIGS. 2A and 2B are a plan view and a side view respectively showing the motor device. In FIG. 2B, a cross section in an inner portion of a motor body is shown inside a fracture area surrounded by break lines.

This motor device 1 is configured as including a motor 2, and a plurality (three in the present embodiment) of connecting members 5 for connections between motor windings 3 of the motor 2 and a terminal block 4. The motor 2 includes a bottomed cylindrical motor case 20, an annular stator core 21 received in the motor case 20, a rotor 22 disposed inside the stator core 21, a motor shaft 23 penetrated through the center of the rotor 22 and rotatably supported integrally with the rotor 22, and a covering member 24 made of a molded resin and covering an opening of the motor case 20.

The motor device 1 is used as, e.g., a vehicle traction driving source, and is supported by a supporting portion of a vehicle body not shown. Further, the terminal block 4 is connected with a wire harness (not shown) which is connected to an inverter at one end thereof; and in the terminal block 4 the wire harness is electrically connected to the connecting members 5 at the other end thereof. A motor current to be output from the inverter is provided through the wire harness and the connecting members 5 and to the motor 2. The terminal block 4 is fixed to a terminal block fixing portion of the vehicle body (not shown).

The three connecting members 5 are connected by welding to the motor windings 3, respectively. Further, the three connecting members 5 are each formed in the same shape, but in the following description, it is necessary to distinguish them, and therefore the connecting members 5 are described as the first connecting member 5A, the second connecting member 5B, and the third connecting member 5C.

The stator core 21 is made of a magnetic material such as steel or the like. The stator core 21 is provided with a plurality of teeth 211 which inwardly project toward the rotor 22, and the plurality of teeth 211 are wound with the motor windings 3 respectively therearound. In the present embodiment, the motor windings 3 are made of a rectangular electric wire having a rectangular cross section. More specifically, the motor windings 3 are rectangular electrically insulated wires formed with an insulating coating layer made of enamel around an outer surface of a conductor made of copper. The motor windings 3 are partially exposed from the covering member 24 to the outside of the motor case 20, and molded to the covering member 24.

The rotor 22 has a cylindrical rotor core 221 formed with a through hole for the motor shaft 23 to be inserted therein, and a magnet 222 disposed around an outer portion of the rotor core 221. A plurality of magnetic poles are provided pole S and N poles is positioned alternately to the magnet 222. Motor shaft 23 is rotatably supported by the motor case 20 by a bearing (not shown).

Figure 3:
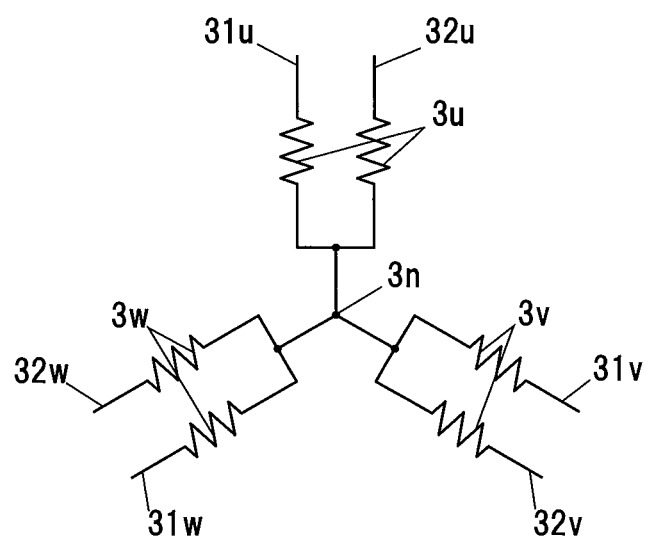
FIG. 3 is a circuit diagram showing a configuration example of an electric circuit in a motor, which is formed by motor windings.

FIG. 3 is a circuit diagram showing a configuration example of an electric circuit in the motor 2, which is formed by the motor windings 3. In the present embodiment, the motor 2 is a three phase AC motor, and the motor windings 3 comprise a U phase winding 3u, a V phase winding 3v, and a W phase winding 3w. The U phase winding 3u, the V phase winding 3v, and the W phase winding 3w are connected to a neutral point 3n in the respective middles. One end 31u and an other end 32u of the U phase winding 3u are provided with a U phase current. One end 31v and an other end 32v of the V phase winding 3v are provided with a V phase current. One end 31w and an other end 32w of the W phase winding 3w are provided with a W phase current.

Figure 4A:
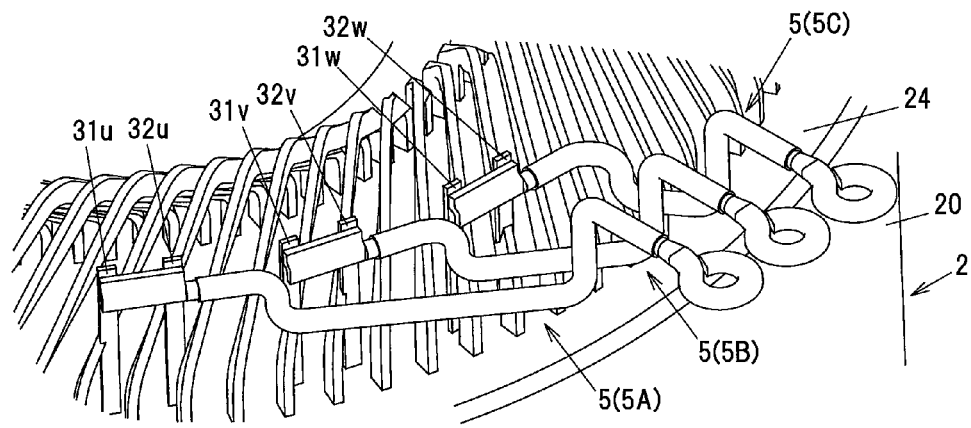
FIG. 4A is a partially enlarged view of FIG. 1 illustrating a peripheral portion of connecting members of the motor device.
Figure 4B:
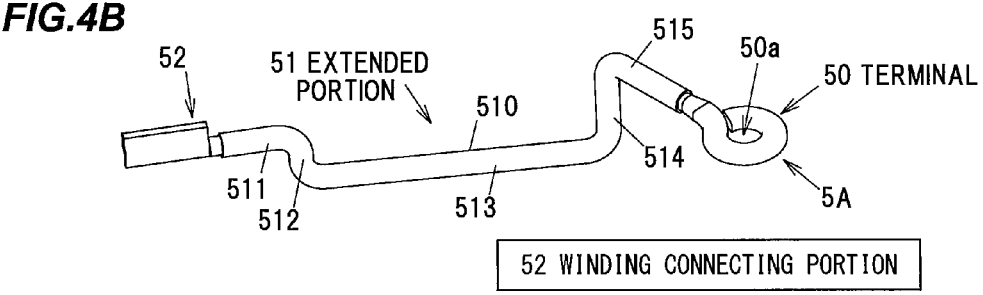
FIG. 4B is a perspective view showing a first connecting member.

FIG. 4A is a partially enlarged view of FIG. 1 illustrating a peripheral portion of the connecting members 5 of the motor device 1. FIG. 4B is a perspective view showing a first connecting member 5A, FIG. 4C is a perspective view showing a second connecting member 5B, and FIG. 4D is a perspective view showing a third connecting member 5C.

As shown in FIG. 4A, the ends 31u and 32u of the U phase winding 3u, the ends 31v and 32v of the V phase winding 3v, and the ends 31w and 32w of the W phase winding 3w, are exposed from the covering member 24, and respectively connected to the connecting members 5. More specifically, the ends 31u and 32u of the U phase winding 3u are connected to the first connecting member 5A, the ends 31v and 32v of the V phase winding 3v are connected to the second connecting member 5B, and the ends 31w and 32w of the W phase winding 3w are connected to the third connecting member 5C. Each connection in these portions is done by, e.g., fusing (heat caulking) or TIG (Tungsten Inert Gas) welding. However, the method for connecting the motor windings 3 and the connecting members 5 is not limited thereto.

Figure 4C:
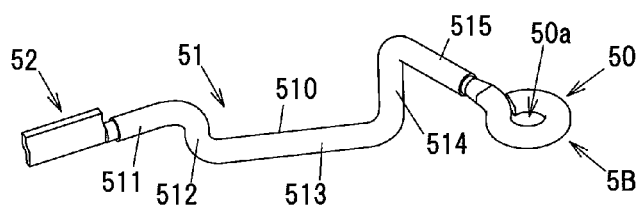
FIG. 4C is a perspective view showing a second connecting member.
Figure 4D:
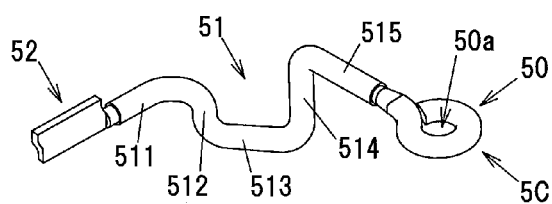
FIG. 4D is a perspective view showing a third connecting member.

As shown in FIGS. 4B to 4D, the connecting member 5 is provided with a terminal 50 to be connected to a terminal block 4 (shown in FIG. 1), a winding connecting portion 52 to be connected to the motor winding 3 and an extended portion 51 extending from the terminal 50 to the winding connecting portion 52. In the first embodiment, the terminal 50, the extended portion 51 and the winding connecting portion 52 are formed by plastically deforming a solid wire as a raw material which is a conductor formed of copper, etc., having a circular cross section. In the first embodiment, the extended portion 51 of the solid wire is covered with an insulating member 510 formed of a resin such as polyimide, and the terminal 50 and the winding connecting portion 52 are exposed from the insulating member 510. Alternatively, the connecting member 5 may be formed of only a solid wire in which the terminal 50, the extended portion 51 and the winding connecting portion 52 are not covered with the insulating member 510. In other words, the connecting member 5 may not have the insulating member 510.

The diameter of the constituent single wire of the connecting members 5 is desirably not less than 1.5 mm and not more than 8.0 mm, more desirably not less than 2.0 mm and not more than 6.0 mm. By thus setting the diameter of the constituent single wire of the connecting members 5, it is possible to hold the connecting members 5 in a predetermined shape. This allows suppressing the vibration of the connecting members 5 due to the vibration of the motor, and reducing stresses caused in the connected portions between the winding connecting portions 52 and the motor windings 3, as compared with when the connecting members 5 comprise, e.g. a flexible stranded wire. And this stress reduction allows preventing the detachment of the winding connecting portions 52 from the motor windings 3.

One end of the solid wire is bent into a ring shape to form a bolt insertion hole 50a for inserting a fixing bolt and the bent solid wire is pressed and flattened in an axial direction of the bolt insertion hole 50a, thereby forming the terminal 50. Alternatively, the terminal 50 may be a crimping terminal. In this case, a crimping portion of the crimping terminal is crimped to an end of the extended portion 51.

Another end of the solid wire opposite to the terminal 50 is pressed and flattened into a plate shape, thereby forming the winding connecting portion 52. In addition, the winding connecting portion 52 is formed so that length in the longitudinal direction thereof is greater than a distance between both ends of the motor winding 3 of each phase. In more detail, the winding connecting portion 52 of the first connecting member 5A to be connected to the U-phase winding 3u is formed to be longer than the distance between the two ends 31u and 32u. The winding connecting portion 52 of the second connecting member 5B to be connected to the V-phase winding 3v is formed to be longer than the distance between the two ends 31v and 32v. The winding connecting portion 52 of the third connecting member 5C to be connected to the W-phase winding 3w is formed to be longer than the distance between the two ends 31w and 32w.

The extended portion 51 is bent into a predetermined shape suitable for connection between the ends of the motor winding 3 (the ends 31u and 32u of the U-phase winding 3u, the ends 31v and 32v of the V-phase winding 3 or the ends 31w and 32w of the W-phase winding 3w) to which the winding connecting portion 52 is connected and the terminal block 4 to which the terminal 50 is fixed.

In more detail, the extended portion 51 has a first extended portion 511, a second extended portion 512, a third extended portion 513, a fourth extended portion 514 and a fifth extended portion 515. The first extended portion 511 extends continuously from the winding connecting portion 52 along a longitudinal direction of the winding connecting portion 52, the second extended portion 512 extends from an end of the first extended portion 511 toward the lid member 24 along an axial direction of the motor 2, the third extended portion 513 extends from an end of the second extended portion 512 toward the outside of the motor 2 so as to be inclined with respect to a radial direction of the motor 2, the fourth extended portion 514 extends from an end of the third extended portion 513 in a direction separating from the lid member 24 so as to be in parallel to the second extended portion 512, the fifth extended portion 515 extends from an end of the fourth extended portion 514 toward the outside of the motor 2 along the radial direction of the motor 2 and an end portion of the fifth extended portion 515 continues to the terminal 50. The first to fifth extended portions 511 to 515 are in continuity so as to have a smooth curve at each end.

The three connecting members 5 are the same in respective shapes and lengths of the first, second, fourth and fifth extended portions 511, 512, 514 and 515 but are different in length of the third extended portion 513. In the example shown in FIGS. 1, 4A and 4B, the third extended portion 513 of the second connecting member 5B is shorter than the third extended portion 513 of the first connecting member 5A and the third extended portion 513 of the third connecting member 5C is further shorter than the third extended portion 513 of the second connecting member 5B. The difference in length of the third extended portion 513 makes the intervals of the terminals 50 of the three connecting members 5 narrower than the intervals of the winding connecting portions 52 of the three connecting members 5.

It should be noted that the shapes of the three connecting members 5 in FIGS. 1, 4A and 4B are shown only by way of example and the invention is not limited to such shapes. In other words, the shape of the connecting member 5 can be freely determined so as to avoid contact with the surrounding members as long as it is a suitable shape for connecting the motor winding 3 to the terminal block 4. Here, "the suitable shape" is a shape which allows the terminal 50 of each connecting member 5 to be connected to the terminal block 4 effortlessly, i.e., without plastically deforming the extended portion 51 again when, e.g., the winding connecting portion 52 has been welded to the ends of the motor winding 3.

Figure 5A:
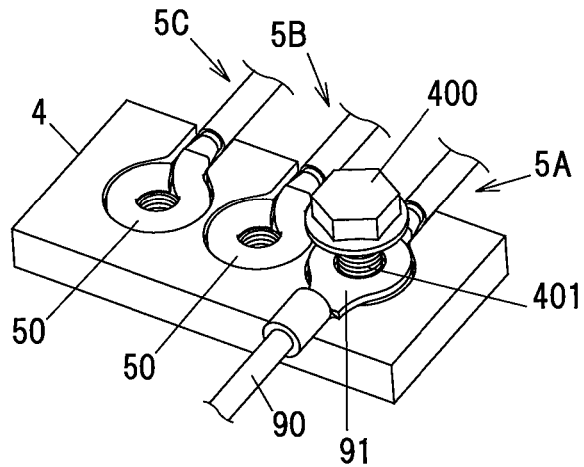
FIGS. 5A to 5C show a terminal block and a peripheral portion therearound.
Figure 5B:
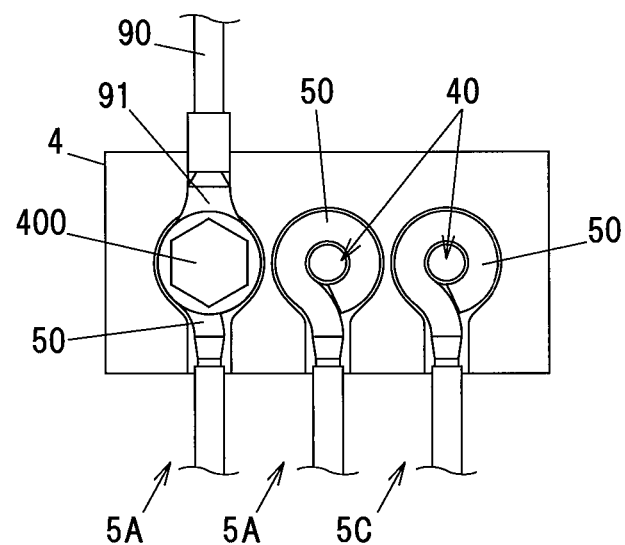
Figure 5C:
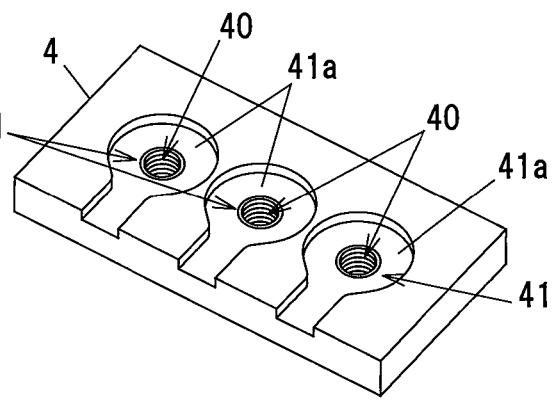

FIGS. 5A to 5C show the terminal block 4 and the periphery thereof; wherein FIGS. 5A and 5B are perspective and plan views showing a state when connecting the terminals 50 of the three connecting members 5 to the terminal block 4 and FIG. 5C is a perspective view showing the terminal block 4.

After the three connecting members 5 (the first to third connecting members 5A, 5B and 5C) are formed in the shapes shown in FIGS. 4B to 4D, the winding connecting portions 52 are connected to the ends of the motor windings 3 by welding and the connecting members 5 are subsequently connected (fixed) to the terminal block 4 by bolts 400.

Three screw holes 40 to be screwed with threaded portions 401 of the bolts 400 and three recessed portions 41 each having a bottom surface 41a with the screw hole 40 opening thereon are formed on the terminal block 4. The recessed portion 41 has a shape which can house a portion of the terminal 50 of the connecting member 5.

Together with terminals 91 crimped to electric wires 90 of a wire harness connected to a non-illustrate inverter, the terminals 50 of the connecting members 5 are fixed to the terminal block 4 by the bolts 400. The terminals 50 of the connecting members 5 are thus electrically connected to the terminals 91.

FIGS. 6A to 6C are enlarged views showing the winding connecting portion 52 connected to the ends of the motor winding 3 (e.g. the ends 31u and 32u of the U-phase winding 3u), wherein FIG. 6A is a perspective view showing a state in which the winding connecting portion 52 is in contact with the ends 31u and 32u of the U-phase winding 3u, FIG. 6B is a plan view showing the winding connecting portion 52 as viewed from a connection surface 52a side and FIG. 6C is a plan view when the winding connecting portion 52 and the ends 31u and 32u of the U-phase winding 3u are viewed from a longitudinal direction of the winding connecting portion 52. In FIG. 6B, the ends 31u and 32u of the U-phase winding 3u are indicated by a two-dot chain line.

The winding connecting portion 52 is formed so that the connection surface 52a to be connected to the motor winding 3 is a flat surface. After the connection surface 52a and the ends of the motor winding 3 (the ends 31u and 32u of the U-phase winding 3u in the example shown in FIGS. 6A to 6C) are arranged so as to face each other as shown in FIGS. 6A to 6C, the winding connecting portion 52 of the connecting member 5 is welded and connected to the ends of the motor winding 3 by fusing or TIG welding.

The winding connecting portion 52 is formed integrally (i.e. as one piece) with the extended portion 51 by plastic deformation of a solid wire as a raw material. In the first embodiment, the winding connecting portion 52 has a first plate portion 521 having the connection surface 52a, a second first plate portion 522 arranged at a position offset from the first plate portion 521 by a predetermined distance d in a direction separating from the motor winding 3, and a slant portion 523 formed between the first plate portion 521 and the second first plate portion 522. It is possible to form the winding connecting portion 52 by, e.g., press working using a die.

In addition, the winding connecting portion 52 has plural contact portions 52b to be connected to the motor winding 3 at positions spaced in the longitudinal direction of the winding connecting portion 52. In the first embodiment, the winding connecting portion 52 has two contact portions 52b on the connection surface 52a. The contact portions 52b are located at both longitudinal ends of the winding connecting portion 52, as shown in FIG. 6B. That is, one of the two contact portions 52b which is located at one longitudinal end of the winding connecting portion 52 is connected to the end 31u of the U-phase winding 3u, and another contact portion 52b which is located at another longitudinal end of the winding connecting portion 52 is connected to the end 32u of the U-phase winding 3u.

Note that, although the example in FIGS. 6A to 6C shows the connecting portions between the ends 31u and 32u of the U-phase winding 3u and the winding connecting portion 52 of the connecting member 5 (the first connecting member 5A), the same applies to the connecting portions between the ends 31v and 32v of the V-phase winding 3v and the winding connecting portion 52 of the second connecting member 5B and the connecting portions between the ends 31w and 32w of the W-phase winding 3w and the winding connecting portion 52 of the third connecting member 5C.

Functions and Effects of the First Embodiment

The following functions and effects are obtained in the first embodiment.

(1) Since the extended portion 51 is bent into a predetermined shape suitable for connection between the ends of the motor winding 3 and the terminal block 4, it is possible to easily fix the terminal 50 to the terminal block 4 after connecting the winding connecting portion 52 to the ends of the motor winding 3. This facilitates vehicle assembly work when the motor unit 1 is used as a driving source for running a vehicle. That is, connection work between the winding connecting portion 52 of the connecting member 5 and the ends of the motor winding 3 can be carried out in an easy work environment in which the connecting member 5 is fixed to, e.g., a jig before assembling the motor unit 1 with the vehicle. In addition, since the extended portion 51 is preliminarily bent, it is possible to easily assemble the motor unit 1 with the vehicle while avoiding contact with the surrounding members.

(2) Since the extended portion 51 is formed by plastically deforming a solid wire having a circular cross section and thus does not largely swing even when, e.g., receiving vibration generated by driving a vehicle, it is easy to avoid contact with the surrounding members. In addition, since the plastically-deformed shape can be maintained, it is possible to easily assemble with a vehicle, etc., as described above. Furthermore, having a circular cross section allows a bending direction to be freely determined, which increases the degree of shape freedom of the extended portion 51. That is, in case of having a rectangular cross section, it is easy to bent in a direction orthogonal to the outer surface thereof but it is difficult to bent accurately in a direction inclined with respect to the outer surface. In the first embodiment, since the extended portion 51 is formed by bending a solid wire having a circular cross section, it is possible to bend accurately in any directions.

(3) Since the winding connecting portion 52 has the flat connection surface 52a, a contact area with the motor winding 3 at the time of connection to the motor winding 3 can be increased as compared to the case where the connection surface 52a is a curved surface, and it is thus possible to weld reliably. In other words, if the fusing is performed on the winding connecting portion 52 which is, e.g., still a solid wire as a raw material having a circular cross section, it is not possible to provide a sufficient area (in cross section) at the fusion-welded portion and current density may increase at the welded portion when a motor current flows through the connecting member 5, causing local overheat. Meanwhile, in case of TIG welding, molten metal may run down without staying at the welded portion. In contrast, since the connection surface 52a of the winding connecting portion 52 in the first embodiment is a flat surface, the motor winding 3 formed of a rectangular wire having a rectangular cross section can be brought into surface-contact with the connection surface 52a and this allows reliable welding therebetween.

(4) Since the winding connecting portion 52 is connected to the motor winding 3 by welding, it is possible to firmly fix the connecting member 5 to the motor 2 while suppressing electric resistance as compared to connection by, e.g., screws.

(5) Since the winding connecting portion 52 has the plural contact portions 52b to be connected to the motor winding 3 at positions spaced in the longitudinal direction of the winding connecting portion 52, it is possible to connect, e.g., the two ends 31u and 32u of the U-phase winding 3u to the connecting member 5 at a time. In addition, since the winding connecting portion 52 is connected to the motor winding 3 (the motor 2) at plural positions, the connecting member 5 is stably positioned and it is thus possible to prevent, e.g., a problem of breakage or bending of the welded portion even when the extended portion 51 or the terminal 50 receives an external force due to contact with the surrounding members during assembly of the motor unit 1 with a vehicle.

Second Embodiment

Next, the second embodiment of the invention will be described in reference to FIGS. 7A to 8C. Note that, the members having the same functions as those described in the first embodiment will be denoted by the common reference numerals in FIGS. 7A to 8C and the explanation thereof will be omitted.

FIGS. 7A to 7C show plural connecting members 6 (first to third connecting member 6A, 6B and 6C) in the second embodiment, wherein FIG. 7A is a front view, FIG. 7B is a perspective view and FIG. 7C is a side view. In FIG. 7B, a portion of the motor 2 in the second embodiment is shown together with the plural connecting members 6.

Figure 2:
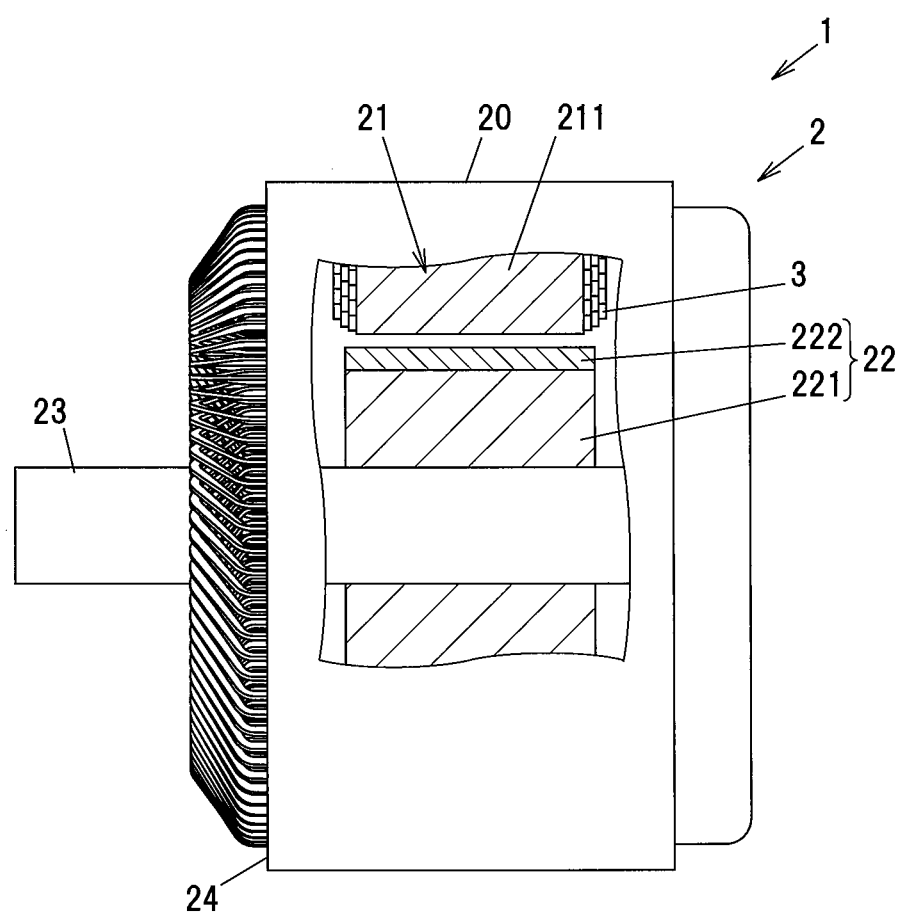
FIG. 2 is a side view showing the motor device.

The motor 2 is provided with the motor case 20 having a bottomed cylindrical shape and the lid member 24 formed of mold resin and covering an opening of the motor case 20 in the same manner as the motor 2 in the first embodiment and has the same inner structure as that shown in FIG. 2 but is different in that an axial end 201 of the motor case 20 protrudes in the axial direction beyond the lid member 24 and an extended portion 61 of each connecting member 6 is formed so as to extend over the end 201. In addition, the motor windings 3 are not exposed from the lid member 24 except the ends 31u, 31v and 31w on one end of the windings of respective phases and the ends 32u, 32v and 32w on another end are electrically connected to the ends 31u, 31v and 31w inside the lid member 24.

In the same manner as the connecting member 5 in the first embodiment, the connecting member 6 is provided with a terminal 60 to be connected to the terminal block 4, a winding connecting portion 62 to be connected to the motor winding 3 and the extended portion 61 extending from the terminal 60 to the winding connecting portion 62. In the second embodiment, the extended portion 61 and the winding connecting portion 62 are formed by plastically deforming a solid wire as a raw material which is a conductor formed of copper, etc., having a circular cross section, and a crimping terminal 600 as the terminal 60 is crimped to an end of the extended portion 61 (an end opposite to the winding connecting portion 62).

The winding connecting portion 62 extends along the axial direction of the motor 2 so as to face the outer surface of the end 31u, 31v or 31w.

The extended portion 61 excluding both ends is covered with an insulating member 610 formed of a resin, and the winding connecting portion 62 and the end of the extended portion 61 to be crimped to the crimping terminal 600 are exposed from the insulating member 610.

The extended portion 61 has a first extended portion 611, a second extended portion 612, a third extended portion 613 and a fourth extended portion 614. The first extended portion 611 extends continuously from the winding connecting portion 62 along a longitudinal direction of the winding connecting portion 62 (in a direction parallel to the axis line of the motor 2), the second extended portion 612 extends from an end of the first extended portion 611 toward the outside of the motor 2 so as to be inclined with respect to the radial direction of the motor 2, the third extended portion 613 extends from an end of the second extended portion 612 so as to face parallel to the first extended portion 611 and the fourth extended portion 614 extends from an end of the third extended portion 613 toward the outside of the motor 2 along the radial direction of the motor 2. The first to fourth extended portions 611 to 614 are in continuity so as to have a smooth curve at each end.

Figure 8A:
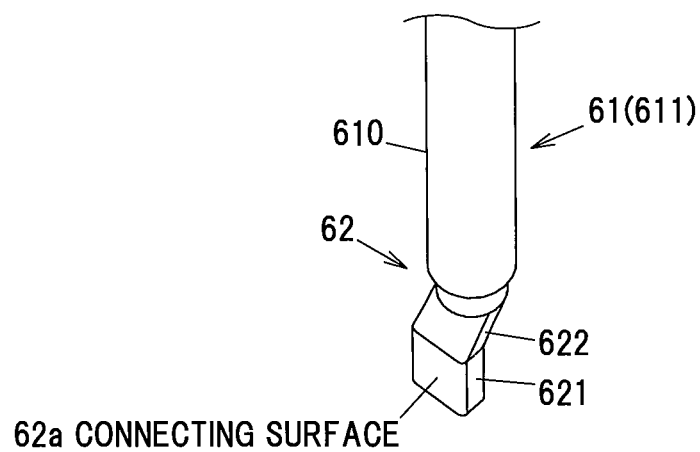
FIGS. 8A, 8B, and 8C are a perspective view, a front view, and a side view respectively showing a winding connecting portion of the connecting member in the second embodiment.
Figure 8B:
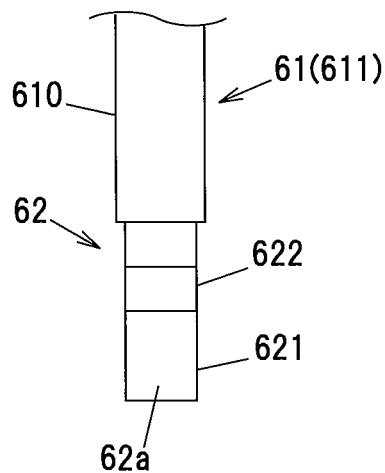
Figure 8C:
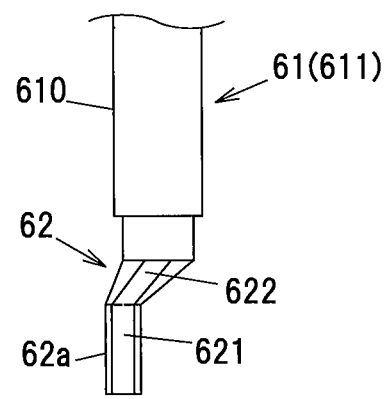

FIGS. 8A to 8C show the winding connecting portion 62 of the connecting member 6, wherein FIG. 8A is a perspective view, FIG. 8B is a front view and FIG. 8C is a side view.

The winding connecting portion 62 has a flat connection surface 62a to be connected to the motor winding 3, a plate portion 621 having a rectangular shape in a cross section orthogonal to the longitudinal direction of the winding connecting portion 62 and a slant portion 622 connecting the plate portion 621 to an end of the extended portion 61 (the first extended portion 611). The slant portion 622 has a tapered shape of which thickness in a direction orthogonal to the connection surface 62a decreases toward the plate portion 621, and the central axis of the slant portion 622 is inclined with respect to the longitudinal direction of the winding connecting portion 62 so that the tip portion on the winding connecting portion 62 side is closer to the ends of the motor winding 3. It is possible to form the winding connecting portion 62 by, e.g., press working using a die in the same manner as the first embodiment.

The second embodiment achieves the same functions and effects as the functions and effects (1) to (4) described in the first embodiment.

Third Embodiment

Next, the third embodiment of the invention will be described in reference to FIGS. 9A to 10C. The third embodiment is to modify the connecting member 6 in the second embodiment so that the winding connecting portion 62 has a different shape and the remaining configuration of the connecting member 6 is the same as that of the second embodiment.

Figure 10A:
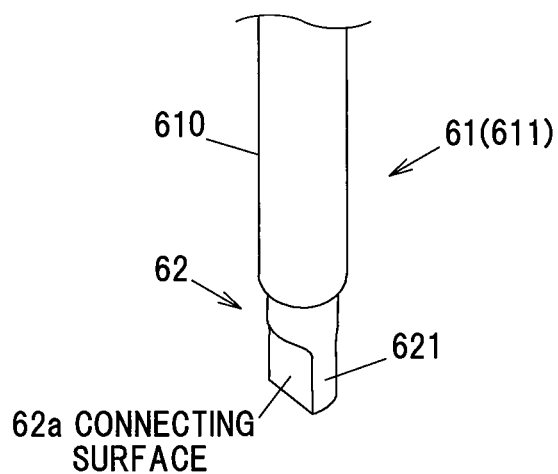
FIGS. 10A, 10B, and 10C are a perspective view, a front view, and a side view respectively showing a winding connecting portion of the connecting member in the third embodiment.
Figure 10B:
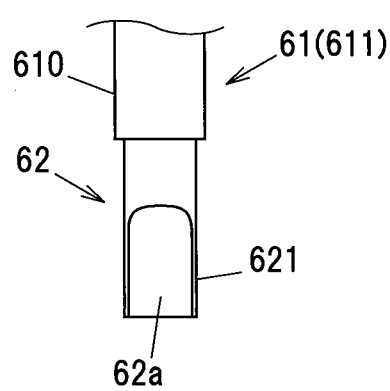
Figure 10C:
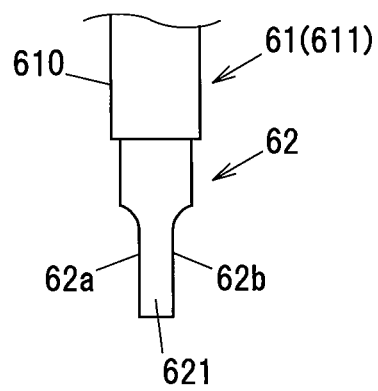

FIGS. 9A to 9C show plural connecting members 6 (first to third connecting member 6A, 6B and 6C) in the third embodiment, wherein FIG. 9A is a front view and FIGS. 9B and 9C are perspective views. FIGS. 10A to 10C show the winding connecting portion 62 of the connecting member 6 in the third embodiment, wherein FIG. 10A is a perspective view, FIG. 10B is a front view and FIG. 10C is a side view.

In the connecting member 6 of the third embodiment, the plate portion 621 at the tip portion of the winding connecting portion 62 has a flat connection surface 62a to be connected to the motor winding 3 and a back surface 62b parallel to the connection surface 62a. The central axis of the plate portion 621 between the connection surface 62a and the back surface 62b substantially coincides with that of the first extended portion 611 of the extended portion 61. In other words, the winding connecting portion 62 of the connecting member 6 in the third embodiment is formed by evenly pressing and flattening from both sides in a radial direction.

The third embodiment also achieves the same functions and effects as the functions and effects (1) to (4) described in the first embodiment. In addition, since the shape of the winding connecting portion 62 is simpler than that of the connecting member 6 in the second embodiment, the winding connecting portion 62 can be shaped by, e.g., applying pressure to or hammering on an end of a solid wire as a raw material and this allows the manufacturing cost to be reduced.

Summary of the Embodiment

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] A motor connecting member (5, 6), which connects a motor winding (3) and a terminal block (4), comprising: a terminal (50, 60) to be connected to the terminal block (4); a winding connecting portion (52, 62) to be connected to the motor winding (3); and an extended portion (51, 61) extending between the terminal (50, 60) and the winding connecting portion (52, 62), wherein the extended portion (51, 61) is made by plastically deforming a single wire having a circular cross section, and is bent in a predetermined shape fitted for connection between an end of the motor winding (3) connected with the winding connecting portion (52, 62) and the terminal block (4).

[2] The motor connecting member (5, 6) according to [1] above, wherein the winding connecting portion (52, 62) is formed integrally with the extended portion (51, 61) by plastically deforming the single wire, and a connecting surface, which is connected to the motor winding (3), is formed as a flat surface.

[3] The motor connecting member (5, 6) according to [1] or [2] above, wherein the winding connecting portion (52, 62) includes a plurality of contacts spaced apart from each other in a longitudinal direction thereof, to be connected with the motor winding (3).

[4] The motor connecting member (5, 6) according to any one of [1] to [3] above, wherein the winding connecting portion (52, 62) is connected by welding to the motor winding (3).

[5] The motor connecting member (5, 6) according to any one of [1] to [4] above, wherein the extended portion (51, 61) is coated by an insulating member (510, 610) made of a resin.

[6] The motor connecting member (5, 6) according to any one of [1] to [4] above, wherein the terminal (50, 60), the winding connecting portion (52, 62), and the extended portion (51, 61) are not coated by an insulating member (510, 610).

[7] A motor device (1), comprising: the motor connecting member (5, 6) according to any one of [1] to [6] above, and a motor (2) in which the motor winding (3) is connected to the winding connecting portion (52, 62).

Although the embodiment of the present invention has been described above, the embodiment described above should not be construed to limit the invention in the appended claims. It should also be noted that not all the combinations of the features described in the above embodiment are essential to the means for solving the problems of the invention.

Further, the present invention may be appropriately modified and practiced without departing from the spirit thereof. For example, although in the above embodiment it has been described that the terminal block 4 is fixed to the vehicle body separately from the motor device 1, the terminal block 4 may be fixed to, e.g., the motor case 20 of the motor 2.

Further, although in the above embodiment it has been described that the motor device 1 is used as a vehicle traction driving source, the use of the motor device 1 is not particularly limited.

Furthermore, although in the above embodiment it has been described that the motor 2 is the three phase AC motor, it is not limited thereto, but this invention may be applied to motors of various types. Also, the way of winding of the motor windings 3 around the teeth in the stator of the motor is not particularly limited, but various ways of winding, such as distributed winding, concentrated winding or the like, may be adopted.

Although the invention is described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A motor connecting member, which connects a motor winding and a terminal block, comprising:
    a terminal to be connected to the terminal block;
    a winding connecting portion to be connected to the motor winding; and
    an extended portion extending between the terminal and the winding connecting portion,
    wherein the extended portion is made by plastically deforming a single wire having a circular cross section, and is bent in a predetermined shape fitted for connection between an end of the motor winding connected with the winding connecting portion and the terminal block,
    wherein the winding connecting portion is formed integrally with and extended along the extended portion by and plastically deforming the single wire, and a connecting surface, which is directly connected to the motor winding, is formed as a flat surface,
    wherein the winding connecting portion comprises a plate shape, and a thickness smaller than a diameter of the extended portion.

2. The motor connecting member according to claim 1, wherein the winding connecting portion includes a plurality of contacts spaced apart from each other in a longitudinal direction thereof, to be connected with the motor winding.

3. The motor connecting member according to claim 1, further comprising a weld joint that electrically connects the flat connecting surface of the winding connecting portion to the motor winding.

4. The motor connecting member according to claim 1, wherein the extended portion is coated by an insulating member made of a resin.

5. The motor connecting member according to claim 1, wherein the terminal, the winding connecting portion, and the extended portion are not coated by an insulating member.

6. A motor device, comprising: the motor connecting member according to claim 1, and a motor in which the motor winding is connected to the winding connecting portion.

7. The motor connecting member according to claim 1, wherein the winding connecting portion includes only a single flat connecting surface that is directly connected to the motor winding.

* * * * *